United States Patent [19]
Sekigawa

[11] 3,977,132
[45] Aug. 31, 1976

[54] PROCESS FOR MANUFACTURING HIGH STRENGTH AL$_2$O$_3$-ZRO$_3$ ALLOY GRAINS

[75] Inventor: Hidekazu Sekigawa, Gunma, Japan

[73] Assignee: The Japan Carlit Company, Ltd., Tokyo, Japan

[22] Filed: Oct. 7, 1974

[21] Appl. No.: 512,236

[30] Foreign Application Priority Data
Mar. 18, 1974   Japan................. 49-029933

[52] U.S. Cl. .................... 51/309 A; 264/56; 264/60; 264/297; 264/332
[51] Int. Cl.² ............... C04B 31/16; C09C 1/40; C09K 3/14
[58] Field of Search .................. 51/309, 293; 249/DIG. 9; 264/299, 297, 220, 56, 332, 60

[56] References Cited
UNITED STATES PATENTS

| | | | |
|---|---|---|---|
| 1,587,462 | 6/1926 | Adams | 264/286 |
| 3,616,157 | 10/1971 | Smith | 264/286 |
| 3,726,621 | 4/1973 | Cichy | 51/309 |
| 3,781,172 | 12/1973 | Pett et al. | 51/309 |
| 3,859,407 | 1/1975 | Blanding et al. | 264/62 |
| 3,891,408 | 6/1975 | Rowse et al. | 51/298 |
| 3,893,826 | 7/1975 | Quinan et al. | 51/295 |

FOREIGN PATENTS OR APPLICATIONS

| | | | |
|---|---|---|---|
| 4,729,982 | 11/1972 | Japan | 51/309 |
| 4,873,893 | 12/1972 | Japan | 51/309 |

*Primary Examiner*—Donald J. Arnold
*Attorney, Agent, or Firm*—Flynn & Frishauf

[57] ABSTRACT

High strength abrasive products are prepared according to the following steps; (a) pouring a molten abrasive composition which takes a needle-like crystal structure upon freezing thereof into a mold set comprising two molds, one surface of said molds having hemisphere-like projections of the same size disposed regularly and closely to each other, the two molds being brought into contact with each other or to within 5 mm apart from each other in such a way that the projections of one mold surface fit into the cavities between the projections of the other, (b) subjecting the molten abrasive composition to cooling for freezing, (c) removing the frozen mass from the molds and (d) crushing the mass into abrasive grains.

4 Claims, 5 Drawing Figures

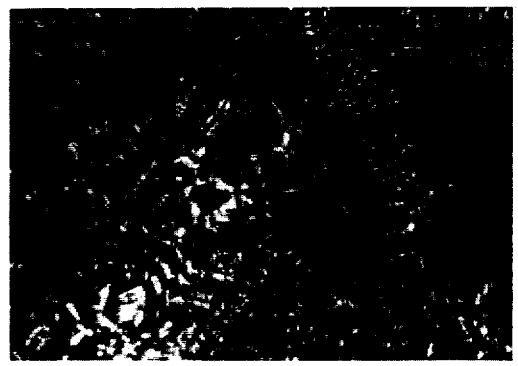
Fig. 3
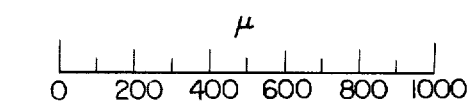
Fig. 4
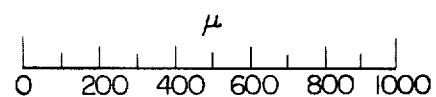
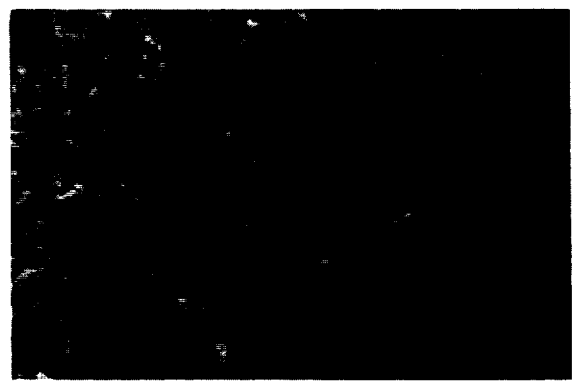
Fig. 5
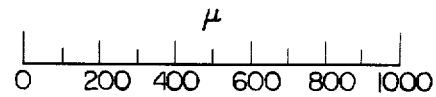

3,977,132

PROCESS FOR MANUFACTURING HIGH STRENGTH AL₂O₃-ZRO₃ ALLOY GRAINS

BACKGROUND OF THE INVENTION

1. Field of the Invention

This invention relates to a process for manufacturing high strength abrasive products and a mold used for the same.

2. Description of Prior Art

Heretofore, processes have been well known in which a molten abrasive composition is poured into a shallow iron dish or into a mold, and is then rapidly cooled to be frozen obtaining a high strength abrasive product thereby. For example, those methods are used for an improvement in a process for manufacturing fused regular $Al_2O_3$ abrasive grains.

Some of the other prior arts processes are as follows. Japanese Public Disclosure No. 29982/72 discloses a process comprising filling iron balls, etc., unreacted with a molten abrasive composition in case iron mold, pouring a molten abrasive composition into said mold, and subjecting it to rapid cooling. In the process of Japanese Public Disclosure No. 73893/73, an abrasive composition is poured into spaces formed by a plurality of metallic plates disposed in parallel to each other, and then subjecting to rapid cooling.

However, in proportion to the increase in the importance of heavy duty grinding operation during the recent years, the demand for high strength abrasive grains is increasing.

SUMMARY OF THE INVENTION

The primary object of this invention is to provide abrasive grains possessing uniform and high strength.

Another object of this invention is to provide a mold suitable for manufacturing abrasive grains possessing high strength with convenient treating.

Still another object of this invention is to provide a process for manufacturing abrasive grains of the described type not requiring a special atmosphere, intricate equipment and complicated processing techniques.

Other objects and advantage of the invention will become apparent from the following description.

It has been found that products have very high strength when the resulting products are in the form of fine and randomly growing needle-like crystals.

For example, the diameter of the portion of the crystal which is 5 mm away from the surface of the mold is 3 times as large as the diameter of that portion which grows in the vicinity of the mold surface. As a result, the strength of the crystal larger in diameter tends to decrease to almost half the strength of the smaller crystal.

Therefore, unless empty spaces at various portions between the two mold inner surfaces are kept as narrow as possible, and uniform, the frozen abrasive products will be weak and lack uniformity.

BRIEF DESCRIPTION OF THE DRAWINGS

FIG. 3 is a microphotograph of the crystal structure of abrasive grains according to the present invention.

FIG. 4 is a microphotograph of the crystal structure of the abrasive grains according to a prior art.

FIG. 5 is a microphotograph of the crystal structure of the abrasive grains which are in the form of coarse crystals according to another prior art.

DESCRIPTION OF PREFERRED EMBODIMENT

A mold set comprises two molds having hemispheric projections disposed regularly and closely to each other. The two molds may be brought into contact with other or within 5 mm apart from each other in such a way that the projections of one mold surface fit into the cavities between the projections of the other. An abrasive composition which acquires needle-like crystal structure upon freezing is poured into said mold set, and subjected to cooling for freezing. Thereafter, the frozen mass is separated from the molds and crushed into abrasive grains. The abrasive composition employed in the present invention is capable of forming needle-like crystal structure upon freezing thereof. In particular, $Al_2O_3$-$ZrO_2$ alloy which forms dendritic structure (about 15 to 50 wt % of $ZrO_2$) is excellent as an abrasive composition.

Figure 1:
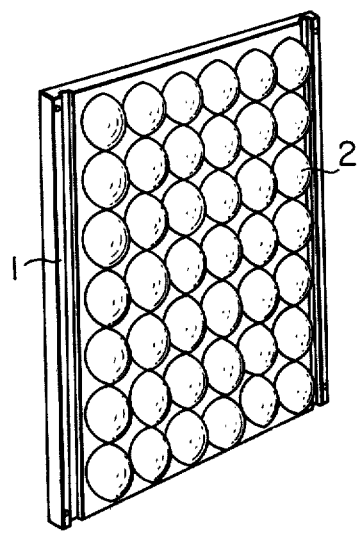
FIG. 1 is an oblique view, illustrating one surface of a mold having hemispheric projections of the same size disposed regularly and closely to each other.

Referring first to FIG. 1, one surface 1 of a mold has hemispheric projections 2 of the same size disposed regularly and closely to each other. The shapes of the projections include hemisphere, somewhat larger or smaller than the regular size of the hemisphere, hemispheroid and the like. The diameter of the hemispheric projections is in the range of from about 5 to 80 mm, and preferably, in the range of from 10 to 50 mm. If the diameter of the projections is smaller than 5 mm, the pouring operation of the molten abrasive composition into a mold set becomes very difficult, the mold set is damaged by molten composition thereof and the yields are very poor. On the other hand, if the diameter is larger than 80 mm, the spaces to be cooled are too large, whereby cooling of the molten abrasive composition will take longer resulting in weak abrasive products.

Figure 2:
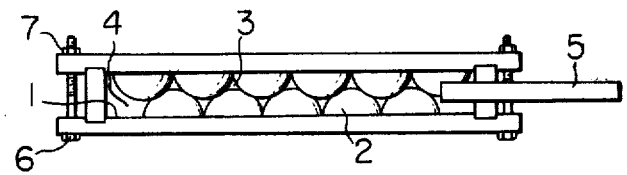
FIG. 2 is a sketch view from above, illustrating the mode of pouring the molten abrasive composition into a mold set.

Referring to FIG. 2, the two molds having projections 2 are brought into contact with each other or within 5 mm apart from each other in such a way that the projections 2 of one mold surfact 1 fit into the cavities between the projections of the other, thereby forming small spaces 3.

Since there are relatively large spaces 4 at both sides and the bottom portion in the mold set, it is necessary to remove such relatively large spaces 4. For this reason, iron bars are inserted into said spaces to form small spaces (not shown) in close approximity of within 5 mm to each other, and said both sides and bottom portion are sealed up by means of bolt 6 and nut 7, and of putting the mold set onto a thick, flat iron plate (not shown). Alternatively, projections at both sides and bottom portions in the other mold may be a quarter sphere (not shown) except the four projections on the four corners may be an eighth sphere (not shown), and said both sides and bottom portions are sealed up exactly in the same manner as indicated above. Cast iron may be used for the molds.

A molten abrasive composition is poured into the small spaces 3 of the mold set as shown in FIG. 2 from above the mold through an iron trough 5, leaving a large space of more than 5 mm at the upper portion of the mold set. The molten abrasive composition is cooled from three directions at points on the curved surfaces of the projections, whereby the resulting frozen mass has fine, needle-like crystals which grow randomly in three dimensions. Thereafter, the frozen mass is removed from the mold set, and crushed and sifted by conventional methods into abrasive grains.

The following examples are given to further illustrate this invention, but it should be understood that the invention is by no means limited thereto. On the contrary, they are given only to clarify some of the essential working modes of the present invention.

EXAMPLE 1.

A mold set (the interval between the two inner mold surfaces being 23 mm) consists of two molds (310 mm high and wide each) having hemispheric projections of 28 mm in diameter disposed in ten files of ten regularly and closely spaced to each other as seen in FIG. 1. Into said mold set 4 kilograms of a molten abrasive composition comprising 75 wt % of $Al_2O_3$ and 25 wt % of $ZrO_2$ was poured, then subjected to cooling for freezing.

Said mold set was disjointed and then the frozen mass was removed from the mold inner surfaces. This removal was very easily realized without causing any particular trouble, when compared with conventional molds. This frozen mass was crushed and sifted into 8 mesh abrasive grains.

The crushing strength per each abrasive grain and its fluctuation were determined by using the Amsler type universal testing machine. For the purpose of comparing thereof with a prior art, the same molten abrasive composition as mentioned above was poured into spaces formed by two flat iron plates disposed in parallel to each other (300 mm high and wide each, and the interval between plates being 12 mm). After the same procedure as mentioned above was followed, the crushing strength per each abrasive grain and its fluctuation were determined. These results are shown in Table 1 below.

Table 1

| Abrasive grains | *Average crushing strength (kg/grain) | Numerical fraction (%) of tested abrasive grains existing in a limited range from average crushing strength. Within ±20 kg | ±40 kg |
|---|---|---|---|
| According to the present invention | 174 | 29 | 50 |
| According to the prior art (using spaces formed by two flat iron plates) | 147 | 10 | 36 |

Note:
*In each case the number of abrasive grains tested was 100.

A microphotograph of crystal structure of the abrasive grains according to the present invention is shown in FIG. 3, and a microphotograph of that according to the prior art in FIG. 4. As seen in FIGS. 3 and 4, the crystal growth according to the prior art as all in parallel, while that according to the present invention is apparently very random in three dimension.

EXAMPLE 2

A mold set (the interval between the two inner mold surfaces being 30 mm) consists of two molds (340 mm high and 330 mm wide) having hemispheric projections of 42 mm in diameter disposed in seven files of seven regularly and closely to each other as seen in FIG. 1. Into the mold set 4.3 kilograms of a molten abrasive composition comprising 75 wt % of $Al_2O_3$ and 25 wt % of $ZrO_2$ was poured and then subjected to cooling for freezing.

Said mold set was disjointed and then the frozen mass was removed from the mold inner surfaces. The frozen mass was crushed and sifted into 8-mesh abrasive grains.

By the same methods as mentioned in Example 1, the crushing strength per each abrasive grains and its fluctuation were determined. Further, for the purpose of comparing with prior art, the same molten abrasive composition as mentioned above was poured into a cylindrical mold (made by cast iron) being 270 mm in inner diameter and 300 mm in depth, filled with 50 iron balls being 42 mm in diameter. Thereafter, the same procedure as mentioned above was followed, the crushing strength per each abrasive grain and its fluctuation were determined. These results are shown in Table 2 below.

Table 2

| Abrasive grains | *Average crushing strength (kg/grain) | Numerical fraction (%) of tested abrasive grains existing in a limited range from average crushing strength Within ±20 kg | ±40 kg |
|---|---|---|---|
| According to the present invention | 178 | 30 | 49 |
| According to prior art (using cylindrical mold filled by iron balls) | 162 | 13 | 32 |

Note:
*In each case the number of abrasive grains tested was 100.

A microphotograph of the crystal structure of the abrasive grains which are in the form of coarse crystals according to a prior art is shown in FIG. 5. These are regarded to have grown in relatively large spaces having an interval of more than 5 mm from the surfaces of iron balls. As seen in FIG. 5, the abrasive grains according to the prior art contain crystals that are coarse compared with those obtained by the present invention.

What is claimed is:

1. A process for manufacturing high strength abrasive grains comprising (a) pouring a molten $Al_2O_3$-$ZrO_2$ alloy abrasive composition its $ZrO_2$ content of which is from about 15 to about 50 wt. % and which acquires needle-like crystal structure by freezing thereof into a mold set comprising two molds, one surface of each mold having hemisphere-like projections of the same size disposed regularly and closely to each other, the two molds being brought into contact with each other or within 5 mm apart from each other in such a way that the projections of one mold surface fit into the cavities between the projections of the other, (b) subjecting to cooling for freezing, (c) removing the frozen mass from the molds and (d) crushing the mass into abrasive grains.

2. The process as claimed in claim 1, wherein the abrasive composition comprises about 75 weight percent of $Al_2O_3$ and about 25 weight percent $ZrO_2$.

3. The process as claimed in claim 1, wherein the hemisphere-like projections are hemispheric projections having a range of from about 5 to 80 mm in diameter.

4. The process as claimed in claim 1, wherein the hemisphere-like projections are hemispheric projections having a range of from about 10 to 50 mm in diameter.

* * * * *